United States Patent [19]

Lima et al.

[11] Patent Number: 4,648,850

[45] Date of Patent: Mar. 10, 1987

[54] LOW-PRESSURE ARC DISCHARGE LAMP HAVING A COMMON PASSAGEWAY AND METHOD OF MANUFACTURING SAME

[75] Inventors: Joseph V. Lima, Salem; Richard J. Shea, Danvers, both of Mass.

[73] Assignee: GTE Products Corporation, Danvers, Mass.

[21] Appl. No.: 832,561

[22] Filed: Feb. 24, 1986

[51] Int. Cl.⁴ ............................. H01J 9/24; H01J 9/26
[52] U.S. Cl. ........................................ 445/22; 65/54; 65/56
[58] Field of Search ................. 65/54, 55, 56; 445/22, 445/26

[56] References Cited

U.S. PATENT DOCUMENTS

| | | | |
|---|---|---|---|
| 2,624,978 | 1/1953 | Hohmann | 65/54 X |
| 2,624,979 | 1/1953 | Clever et al. | 65/56 X |
| 3,501,662 | 3/1970 | Plagge | 313/109 |
| 4,324,447 | 4/1982 | Van der Wolf et al. | 445/22 |
| 4,374,340 | 2/1983 | Bouwknegt et al. | 313/220 |
| 4,530,710 | 7/1985 | Dullea et al. | 445/26 X |
| 4,545,774 | 10/1985 | Van Gils et al. | 445/22 |

Primary Examiner—Kenneth J. Ramsey
Attorney, Agent, or Firm—Carlo S. Bessone

[57] ABSTRACT

A method of manufacturing a low-pressure arc discharge lamp formed by interconnecting two or more adjacent glass discharge tubes. A hermetically sealed common passageway between the two adjacent tubes is formed by positioning the tubes in a contiguous relationship to define at least one common location of contact. Heating a preselected area of the internal surface of each of the tubes relative to the common location of contact to soften the glass to the extent a common passageway is defined between the tubes. Thereafter, separating the tubes a predetermined distance while the glass is in a softened state to stretch the softened glass, thereby extending the common passageway between the tubes. The technique may be applied to multiple tube assemblies precoated with a luminescent layer by alternating the end of the tube at which the passageway is formed. Once the tubes are joined, they may be processed by current manufacturing techniques to produce a low-pressure arc discharge lamp.

19 Claims, 5 Drawing Figures

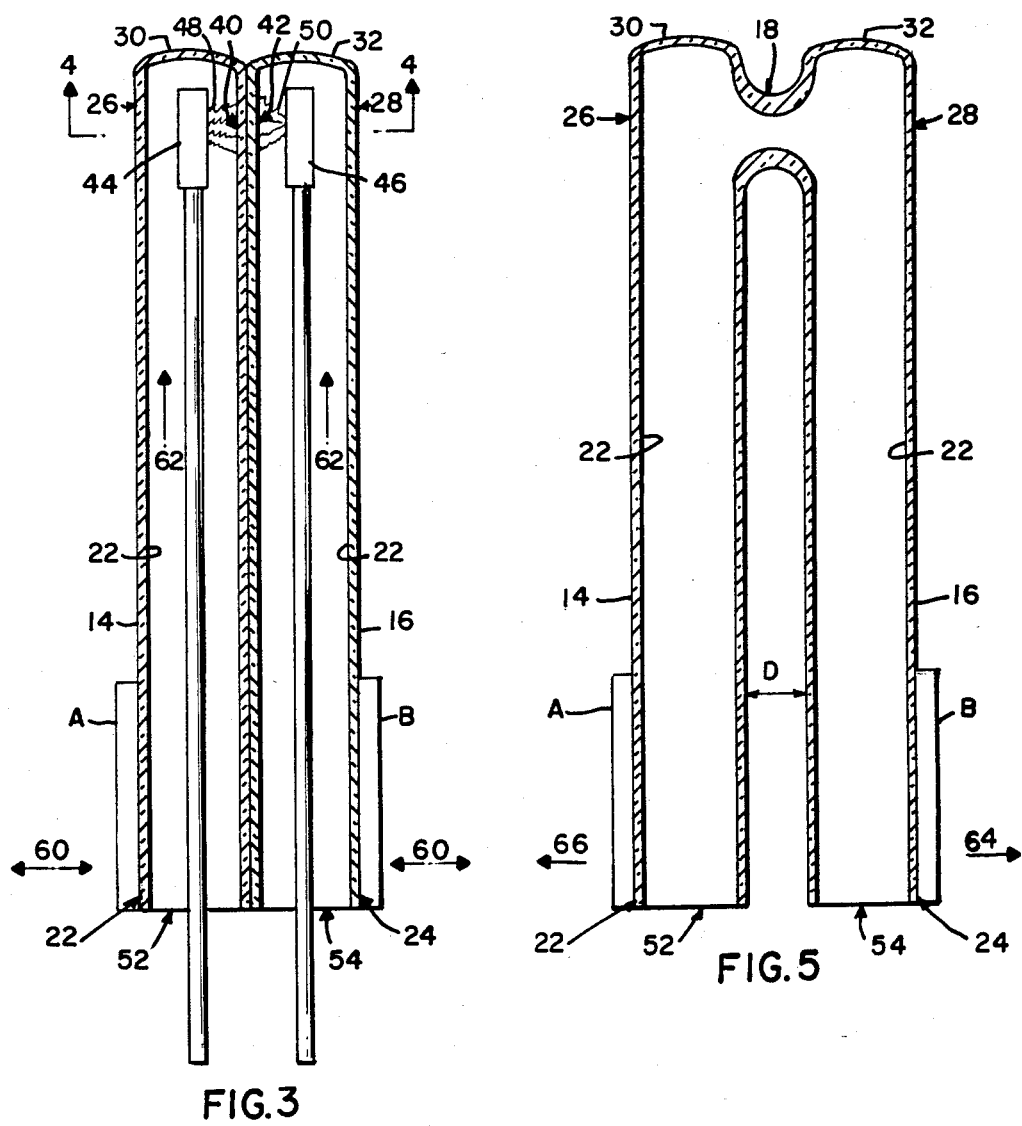
FIG.3
FIG.5
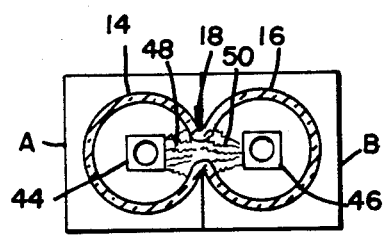
FIG.4

LOW-PRESSURE ARC DISCHARGE LAMP HAVING A COMMON PASSAGEWAY AND METHOD OF MANUFACTURING SAME

TECHNICAL FIELD

This invention relates to low-pressure arc discharge lamps and more particularly to such lamps having two or more parallel discharge tubes with an arc-containing interconnecting passageway, and methods for producing same.

BACKGROUND ART

Methods of manufacturing low-pressure mercury vapor discharge lamps are described, for example, in U.S. Pat. Nos. 3,501,662 and 4,324,447. The techniques described in these patents and in other prior art constructions represent relatively low cost methods of producing these lamps. The methods described in U.S. Pat. No. 3,501,662 requires that apertures be formed in the sidewalls of the discharge tubes precoated with a luminescent layer followed by joining such tubes with a fused solder glass seal. This multi-step method does not readily adapt itself to automation. The method described in U.S. Pat. No. 4,324,447 requires the formation of separately blown collars on each discharge tube which are subsequently fused. This also is a multi-step method which can be practiced only with tubes having sufficient wall thickness so as to enable formation of the collars and subsequent fusing thereof. The latter method, when employed with tubes precoated with a luminescent layer can result in a weakened arc-containing channel, for example, as a result of luminescent phosphor particles embedded within the glass forming the channel.

BRIEF SUMMARY OF THE INVENTION

It is, therefore, an object of this invention to obviate the disadvantages of the prior art.

It is another of the invention to provide a reliable and economical method of manufacture of a low-pressure arc discharge lamp wherein two or more parallel glass discharge tubes have an arc-containing passageway between adjacent discharge tubes.

Another object of the invention is to provide a method of manufacture of a low-pressure arc discharge lamp which may be practiced substantially without restriction on the length dimension of the lamp.

Still another object of the invention is to provide a method of manufacture of a low-pressure arc discharge lamp by joining two or more parallel glass discharge tubes where such method is readily adapted to automation and is carried out in relatively few steps.

It is still another object of the invention to provide a reliable method of manufacture of a low-pressure arc discharge lamp with an arc-containing passageway wherein the glass forming the passageway is substantially free of embedded phosphor particles from the luminescent layer.

It is still another object of the invention to provide a method of manufacture of a low-pressure arc discharge lamp with an arc-containing passageway by joining two or more parallel glass discharge tubes precoated with a luminescent layer.

It is still another object of the invention to provide an improved low-pressure arc discharge lamp made in accordance with the method to be described hereinafter.

These objects are accomplished, in one aspect of the invention, by the provision of a method of manufacturing an envelope for an arc discharge lamp having at least two elongated adjacent glass tubes wherein the tubes are connected by a common passageway. Such method comprises the steps of positioning the tubes in a contiguous relationship to define at least one common location of contact; heating a preselected area of the internal surface of each of the tubes relative to the common location of contact to soften the glass to the extent a common passageway is defined between the tubes; and thereafter separating the tubes a predetermined distance while the glass is in the softened state to stretch the softened glass, thereby extending the common passageway between the tubes.

In accordance with further teachings of the present invention, a low-pressure arc discharge lamp comprises an envelope having at least two elongated tubes positioned adjacent at a predetermined distance and connected by a hermetically sealed common passageway formed by heating a preselected area of the internal surface of each of the tubes relative to a common location of contact between the tubes and thereafter separating the tubes the predetermined distance. A luminescent layer is positioned on the internal surface of the tubes. An electrode is located within each of the end portions of the tubes. An ionizable medium is enclosed within the envelope including an inert starting gas and a quantity of mercury for producing a plasma discharge when a predetermined voltage is applied across the electrodes.

In accordance with still further teachings of the present invention, a method of manufacturing an arc discharge lamp having an envelope containing at least two elongated adjacent glass tubes is described wherein the tubes are connected by a common passageway. Such method of manufacturing an arc discharge lamp comprises the steps of coating the internal surface of the tubes with a luminescent layer; positioning the tubes in a contiguous relationship to define at least one common location of contact; heating a preselected area of the internal surface of each of the tubes relative to the common location of contact to soften the glass to the extent a common passageway is defined between the tubes; thereafter separating the tubes a predetermined distance while the glass is in the softened state to stretch the softened glass, thereby extending the common passageway between the tubes; positioning an electrode within an end portion of each of the tubes; and enclosing an ionizable medium including an inert starting gas and a quantity of mercury within the envelope.

BRIEF DESCRIPTION OF THE DRAWINGS

FIG. 3 is an elevated cross-sectional view showing another step in the method of this invention illustrating the application of heat on the internal walls of the parallel discharge tubes;

FIG. 4 is a cross sectional view taken along the line 4—4 in FIG. 3; and

FIG. 5 is an elevated cross-sectional view showing still another step in the method of the invention illustrating the separating of the discharge tube a predetermined distance D.

BEST MODE FOR CARRYING OUT THE INVENTION

Figures 1, 2:
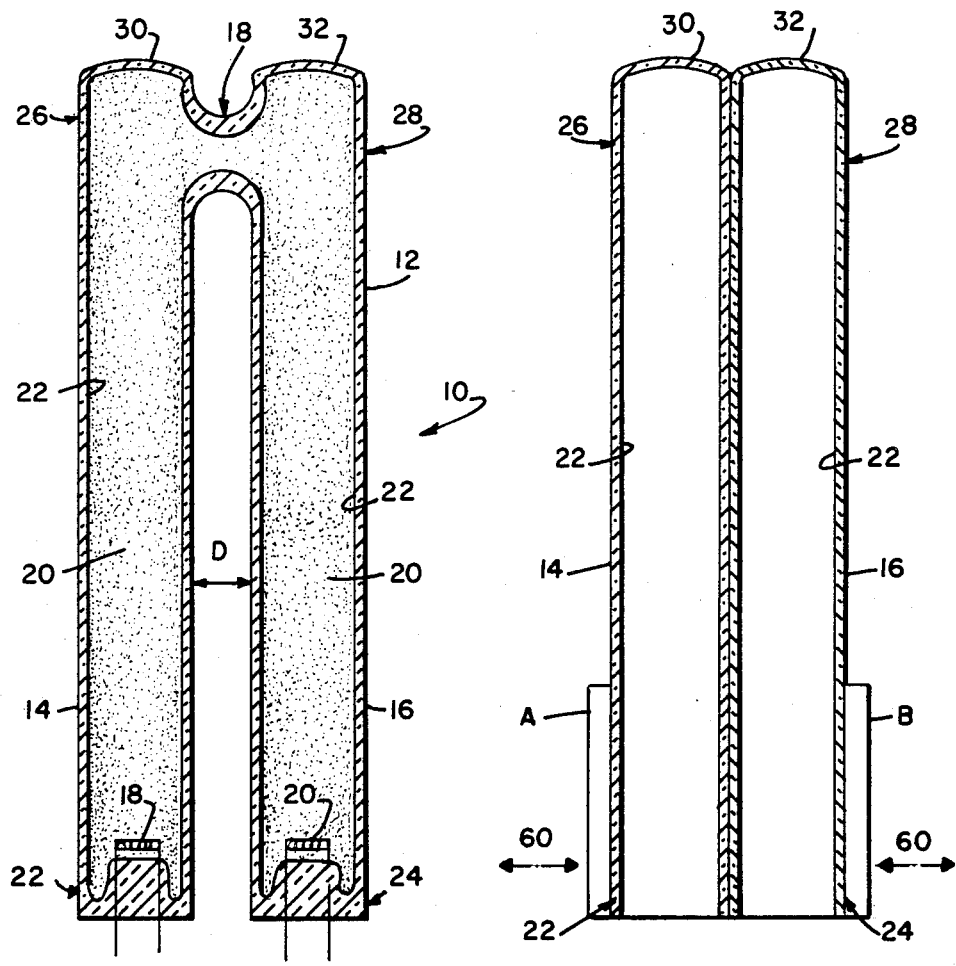
FIG. 1 is an elevated cross-sectional view of one embodiment of a low-pressure arc discharge lamp produced in accordance with the method of the present invention.
FIG. 2 is an elevated cross-sectional view showing a step in the method of this invention in which the parallel discharge tubes are positioned in a contiguous relationship.

For a better understanding of the present invention, together with other and further objects, advantages and capabilities thereof, reference is made to the following disclosure and appended claims taken in conjunction with the above-described drawings.

FIG. 1 shows one embodiment of an arc discharge lamp. Lamp 10 comprises an envelope 12 having at least two elongated substantially parallel tubes 14, 16 positioned adjacent each other at a predetermined distance D and connected by a hermetically sealed common passageway 18. Preferably, end portions 22, 24 of tubes 14, 16 respectively are adjacently located and common passageway 18 is located at opposing ends 26, 28 of tubes 14, 16, respectively. In a preferred embodiment of an arc discharge lamp as shown in FIG. 1, tubes 14, 16 of lamp 10 have closed ends 30, 32, respectively. In a preferred embodiment of an arc discharge lamp, the common passageway 18 is located adjacent closed ends 30, 32. A luminescent layer 20 is positioned on the internal surface 22 of tubes 14, 16. An electrode 18, 20 is located within each of the end portions 22, 24 of tubes 14, 16, respectfully. Envelope 12 encloses an ionizable medium including a quantity of mercury and an inert starting gas. The gas may consist of argon, neon, helium, or a combination thereof at a low pressure in the range of about 1 to 5 millimeters of mercury.

FIGS. 2-5 describe different steps in a method of construction of an envelope for a low-pressure arc discharge lamp, e.g., the lamp of FIG. 1 showing, in particular, steps for the formation of common passageway 18.

Two discharge tubes, such as tubes 14, 16, may be placed in positioning blocks A and B, respectively, as illustrated in FIGS. 2-5. These positioning blocks, which may be controlled by automation, are described herein schematically simply as holders for supporting tubes 14, 16 in upright and substantially parallel positions. Blocks A and B are adapted for transitional motion in the direction of arrows 60 shown in FIGS. 2 and 3 so that distance D between tubes 14, 16 may be adjusted to a predetermined distance.

FIG. 2 shows the discharge tubes 14, 16 in associated positioning blocks A and B in an initial step of the method described herein. Tubes 14, 16 are shown in a substantially parallel contiguous relationship defining at least one common location of contact.

FIGS. 3-4 show another step in the process of manufacturing an arc discharge lamp in accordance with the teachings of the present invention. The internal surface 22 of each of the tubes 14, 16 are heated at a preselected area 40, 42 relative to the common location of contact to soften the glass to the extent a common passageway 18 (FIG. 4) is defined between tubes 14, 16. Softened glass from each of the tubes create the seal which join the tubes together. In a preferred embodiment of the invention the method further includes the step of positioning burners 44, 46 within tubes 14, 16, respectively, through open ends 52, 54 of tubes 14, 16. As best shown in FIG. 3, tubes 14, 16 are maintained in a fixed position and burners 44, 46 are simultaneously moved relative to tubes 14, 16 in the direction as indicated by arrows 62. Alternatively, burners 44, 46 are maintained in a fixed position and tubes 14, 16 are moved relative to burners 44, 46. Flames 48, 50 from burners 44, 46 are directed on preselected areas 40, 42 of the internal surface 22 of tubes 14, 16 to heat areas 40, 42 until a common passageway 18 is produced between the tubes.

It has been discovered that the flames from the burners remove some of the phosphor particles of the luminescent layer from the internal surfaces of the tubes at the preselected areas which could otherwise become embedded within the glass forming the common passageway. As previously mentioned, particles of the luminescent layer embedded within the glass tend to weaken the integrity of the passageway. Alternatively, the luminescent layer can be removed from the preselected areas before heating, for example, by scrapping.

FIG. 5 shows another step in the method of construction of an envelope for an arc discharge lamp, according to the invention. While the glass is still in a softened state, tubes 14, 16 are separated a predetermined distance D, thereby extending common passageway 18 between tubes 14, 16. The separating of tubes 14, 16 and thus the formation of extended common passageway 18 may be accomplished by maintaining tube 14 in a fixed position and moving tube 16 relative to tube 14 in the direction as indicated by arrow 64. Alternatively, the separation of tubes 14, 16 can be accomplished by moving the tubes simultaneously i.e., by moving tube 14 in the direction as indicated by arrow 66 and by moving tube 16 in the direction as indicated by arrow 64. Separation distance D, for example, can be approximately 2.0 millimeters in length. The tubes, so connected and sealed, may be further processed into a low-pressure arc discharge lamp by standard techniques.

The multiple tube connections, the technique of the present invention adjoining the tubes is the same except that the glass channel may occur at alternate ends of the tube to provide maximum discharge length. In this regard, refer to U.S. Pat. No. 3,501,662, which discloses alternate end channels.

There is described herein a reliable and economical method for constructing a low-pressure arc discharge lamp in which there are virtually no restrictions in the length dimension of the lamp. The present invention may be practiced with tubes precoated with a luminescent layer. The glass forming the passageway is substantially free of embedded phosphor particles from the luminescent layer.

While there have been shown what are at present considered to be preferred embodiments of the invention, it will be apparent skilled in the art that various changes in modifications can be made herein without departing from the scope of the invention as defined by the appended claims.

We claim:

1. A method of manufacturing an envelope for an arc discharge lamp having at least two elongated adjacent glass tubes wherein said tubes are connected by a common passageway, said method comprising the steps of:
    positioning said tubes in a contiguous relationship to define at least one common location of contact;
    heating a preselected area of the internal surface of each of said tubes relative to said common location of contact to soften said glass to the extent a common passageway is defined between said tubes; and
    thereafter separating said tubes a predetermined distance while said glass is in said softened state to stretch said softened glass, thereby extending said common passageway between said tubes.

2. The method of claim 1 wherein said tubes are positioned substantially parallel to form said contiguous relationship.

3. The method of claim 1 wherein said heating is performed by flames directed on said preselected areas of said tubes.

4. The method of claim 3 wherein each of said tubes include an open end, said method further including the step of positioning a burner for said flames within each of said tubes through said open ends of said tubes.

5. The method of claim 4 wherein said tubes are maintained in a fixed position and said burners are moved relative to said tubes.

6. The method of claim 4 wherein said burners are maintained in a fixed position and said tubes are moved relative to said burners.

7. The method of claim 1 wherein said separating of said tubes is accomplished by maintaining one of said tubes in a fixed position and moving the other of said tubes relative to said one of said tubes.

8. The method of claim 1 wherein said separating of said tubes is accompanied by moving each of said tubes simultaneously.

9. The method of claim 1 wherein said predetermined distance of separation is approximately 2.0 millimeters.

10. A method of manufacturing an arc discharge lamp having an envelope containing at least two elongated adjacent glass tubes wherein said tubes are connected by a common passageway, said method comprising the steps of:
coating the internal surface of said tubes with a luminescent layer;
positioning said tubes in a contiguous relationship to define at least one common location of contact;
heating a preselected area of said internal surface of each of said tubes relative to said common location of contact to soften said glass to the extent a common passageway is defined between said tubes;
thereafter separating said tubes a predetermined distance while said glass is in said softened state to stretch said softened glass, thereby extending said common passageway between said tubes;
positioning an electrode within an end portion of each of said tubes; and
enclosing an ionizable medium including an inert starting gas and a quantity of mercury within said envelope.

11. The method of claim 10 wherein said tubes are positioned substantially parallel to form said contiguous relationship.

12. The method of claim 10 wherein said heating is performed by flames directed on said predetermined areas of said tubes.

13. The method of claim 12 wherein each of said tubes include an open end, said method further including the step of positioning a burner for said flames within each of said tubes through said open ends of said tubes.

14. The method of claim 13 wherein said tubes are maintained in a fixed position and said burners are moved relative to said tubes.

15. The method of claim 13 wherein said burners are maintained in a fixed position and said tubes are moved relative to said burners.

16. The method of claim 10 wherein said separating of said tubes is accomplished by maintaining one of said tubes in a fixed position and moving the other of said tubes relative to said one of said tubes.

17. The method of claim 10 wherein said separating of said tubes is accomplished by moving each of said tubes simultaneously.

18. The method of claim 10 wherein said predetermined distance of separation is approximately 2.0 millimeters.

19. The method of claim 10 further including the step of removing said luminescent layer from said preselected areas prior to said heating.

* * * * *